Patented Feb. 3, 1925.

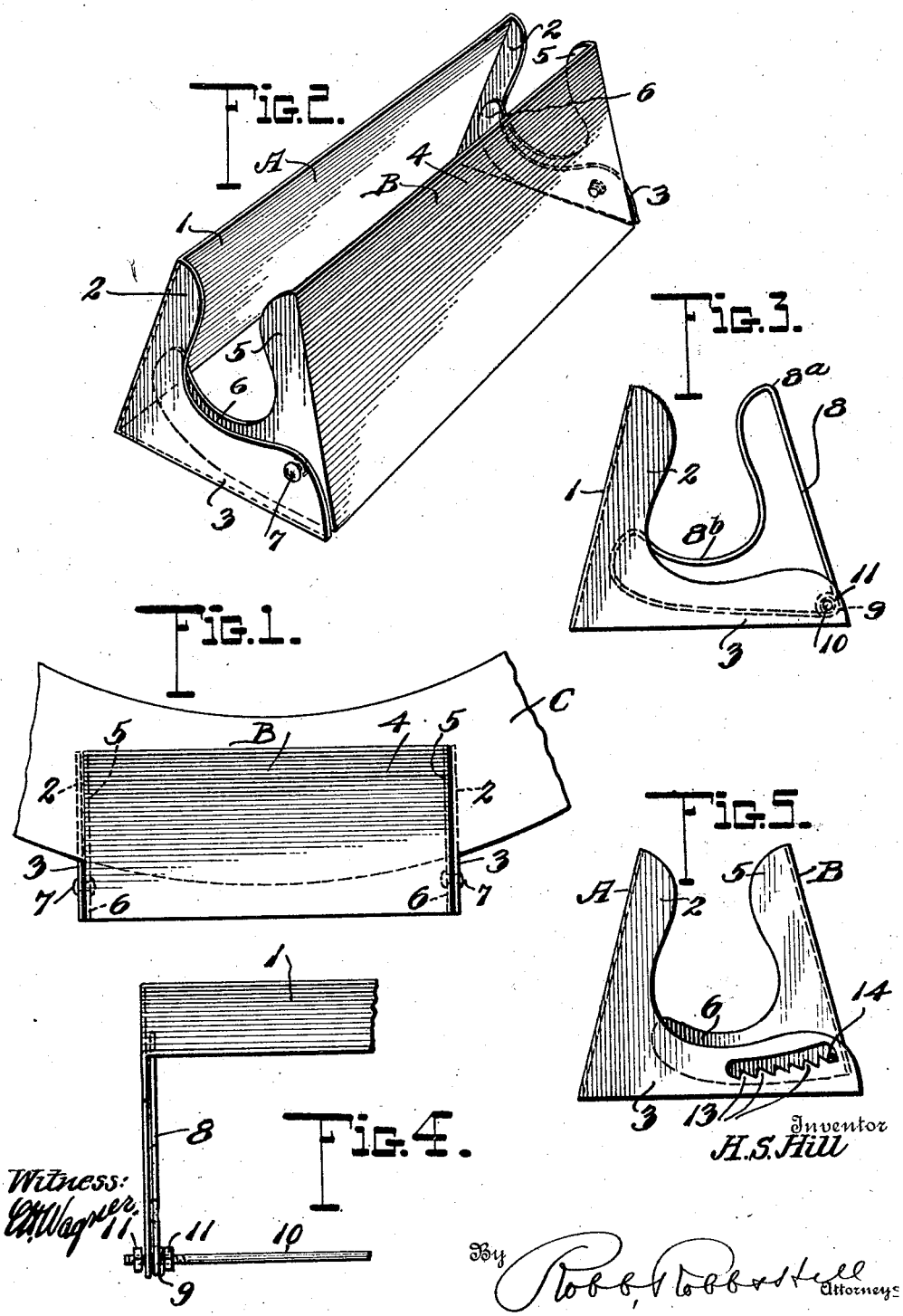

1,524,653

UNITED STATES PATENT OFFICE.

HUGH S. HILL, OF CLEVELAND HEIGHTS, OHIO, ASSIGNOR TO NICHOLAS MOLLET, OF MASSILLON, OHIO.

TIRE-DISPLAY STAND.

Application filed June 16, 1923. Serial No. 645,791.

*To all whom it may concern:*

Be it known that I, HUGH S. HILL, a citizen of the United States, residing at Cleveland Heights, in the county of Cuyahoga and State of Ohio, have invented certain new and useful Improvements in Tire-Display Stands, of which the following is a specification.

The present invention relates to a holder or display stand for circular or annular objects such as tire casings, and has for its object to provide a device of this character which embodies novel features of construction, whereby the tire casings can be readily placed in position upon the stand or removed therefrom, and will be held firmly in an upright position so as to be displayed in an effective manner when it is supported by the stand.

Among the objects of the invention are to provide a tire display stand of this character which is comparatively simple and inexpensive in its construction, which is light in weight and can be readily shipped or carried from place to place, which will firmly grip a tire or like object and hold it securely in an upright position without injury to the tire or the use of any special fastening means, and which may be formed with a panel adapted to receive advertising matter.

With the foregoing and other objects in view the invention consists in certain combinations and arrangements of the parts as will more fully appear as the description proceeds, the novel features thereof being pointed out in the appended claims.

For a full understanding of the invention reference is to be had to the following description and accompanying drawings in which, Figure 1 is a front elevation of a tire display stand constructed in accordance with the invention, showing a fragmentary portion of a tire which is supported thereby.

Figure 2 is a perspective view of the tire display stand.

Figure 3 is an end view of a slightly modified construction of the tire display stand.

Figure 4 is a top plan view of one end of the tire display stand construction illustrated by Figure 3.

Figure 5 is an end view of a tire display stand embodying a further modification of the invention.

Corresponding and like parts are referred to throughout the following description, and indicated on all of the views of the drawing by like reference characters.

Referring more particularly to Figures 1 and 2 of the drawings which illustrate one of many possible embodiments of the invention, the reference characters A and B designate two complemental sections of the tire stand which are adapted to cooperate with each other to grip an annular object such as the tire casing C and support it in an upright position. The section A includes an elongated rectangular plate 1 which is provided at opposite ends thereof with the rearwardly extending flanges 2 and feet or base members 3. The flanges 2 have the edges thereof shaped to conform in a general manner to the exterior configuration of a tire casing and the base members or feet 3 are extended rearwardly a sufficient distance to obtain a firm bearing for the support of the tire stand. The lower edges of the base members 3 are straight and arranged at an acute angle to the front plate 1, so that when the base members rest flat upon a floor or other surface the front plate or panel 1 will be supported in an inclined position.

The other complemental section B is formed with a plate or panel 4 which also has an elongated rectangular formation, although it is slightly narrower than the plate 1 and the lower edge thereof is preferably slightly elevated above the floor surface. The ends of the plate or panel 4 are provided with the rearwardly extending flanges 5 which have a shape or configuration conforming in a general manner to the outer contour of a tire casing. The ends of the plate or panel 4 are also provided with the inwardly extending arms 6 which have the free ends thereof curved upwardly a slight amount. The upper edges of these arms 6 are arranged above the upper edges of the base members 3, so that the tire casing C rests upon the arms. At the junction of the end flanges 5 and arms 6 the complemental section B is pivotally connected to the end portions of the base members 3 of the complemental section A by suitable pivotal members which are indicated at 7. The weight of the tire casing upon the arms 6 tends to swing the complemental section B about the pivot member 7 so that the tire casing is tightly gripped between the two complemental scetions and held firmly in an upright position. This is accomplished without any movement or shifting of the parts in engagement with the floor surface, so that the stand can be used upon a polished surface without danger of marring or injuring the same when the tire casing is being placed in position upon the stand or removed therefrom. The pivotal members 7 are off-set upon one side of the tire casing instead of being placed directly under the tire casing, so that there is no sliding or diverging movement of pivoted leg or supporting members which support the stand.

A slight modification is shown by Figures 3 and 4 in which the section A has substantially the identical construction previously described, although the section B is formed of two skeleton members 8 constructed of wire. The skeleton members each include an upright portion 8ª and an inwardly extending arm 8ᵇ upon which the tire casing rests. The end portions of the wire may be returned or coiled, as indicated at 9, to provide pivot openings for engagement with the pivot bolt 10. If desired this pivot bolt may extend the full length of the tire stand and connect the two base members 3 although this is not essential to the invention, and separate pivot members may be provided at each end of the stand if preferred. Where the pivot bolt 10 extends the full length of the stand, nuts 11 may be suitably threaded thereon to hold the skeleton wire frames in proper position. The skeleton wire frames cooperate in an obvious manner with the section A to grip a tire casing which is placed in the stand and the wire strand which is in engagement with the tire casing can be readily bent and shaped to conform with the contour of the tire casing.

In both embodiments of the invention a flat base is provided which rests upon the floor or other surface and provides a stable support for the tire stand. There are no movable parts in engagement with the floor, and there will accordingly be no danger of scratching or marring a polished surface upon which the stand may be resting when a tire casing is placed in position within the stand or removed therefrom. The side plates or panels can be used for advertising purposes, so that the advertising matter relating to the tire or other object is displayed in connection with the tire. The stand enables a tire to be supported and displayed in a most effective manner and the stand is, at the same time, so simple and inexpensive in its construction that it can be used to advantage for advertising purposes.

A further modification of the invention is shown by Figure 5 in which the base members 3 of the section A are provided with slots 12 which have the lower edges thereof toothed to provide a series of notched seats 13. The ends of the section B are provided at the intersection of the members 5 and 6 with pins or studs 14 which are received within the slots 12 and can be seated within selected notches 13. The section B is pivotally mounted upon the studs 14 and by placing the studs in engagement with different notches 13 the distance between the gripping portions or jaws of the device can be adjusted for proper engagement with different sizes of tires. When the tire is in operative position it rests upon the arms 6 and tends to swing the upper end of the section B inwardly so that the tire is tightly gripped between the jaw portions of the two complemental sections. The operation of the device is exactly as previously described, although the provision of the slots and notched seats enables the jaw members to be adjusted toward or away from each other, so that proper adjustment can be made for engagement with different sizes of tire casings.

Having thus described my invention what I claim as new and desire to secure by Letters Patent is:

1. A display stand for tire casings and the like, including a pair of spaced and parallel base members adapted to rest immovably on a floor surface and extend transversely under a tire casing, a pair of upstanding fixed jaw members projecting from the base members and adapted to engage the tire casing on one side of the plane thereof, a panel connecting the base members and adapted to receive advertising matter, a corresponding pair of complemental jaw members pivotally mounted upon the base members and entirely supported thereby, said complemental jaw members being adapted to engage the tire casing on the opposite side of the plane thereof, and arms rigid with the complemental jaw members and extending under the tire casing transversely thereof so as to support the same, whereby the weight of the tire casing tends to swing the movable jaws toward the fixed jaws and cause the tire casing to be gripped between the same.

2. A display stand for tire casings and the like including a sheet metal section formed with a panel adapted to receiving advertising matter, said panel being provided at the ends thereof with rearwardly extending flange portions constituting base members which rest immovably upon a floor support and jaw members which are adapted to engage one side of a tire casing, and a complemental section including a panel having rearwardly extending flanges at the ends thereof, the complemental section being pivotally connected to the base of the first section and the end flanges of the complemental section forming movable jaws adapted to engage the opposite side of the tire casing and arms which project under the tire casing to support the same, whereby the weight of the tire casing tends to swing the complemental section and cause the tire casing to be gripped between the two sets of jaws, the pivotal connection between the two sections being off-set from a plane passing between the jaws.

3. A display stand for tire casings and the like including a fixed section comprising a panel having rearwardly extending flanges at the ends thereof which form base members, and fixed jaws adapted to engage one side of a tire casing, and independent swinging jaw members pivotally mounted upon the base portions of the end flanges and formed with arms which extend under the tire casing to support the same, whereby the weight of the tire casing tends to cause it to be gripped by the two sets of jaws, the pivotal connections of the swinging jaw members being offset from a plane passing between the jaws.

4. A display stand for tire casings and the like, including a base adapted to rest upon a floor surface and provided with an upstanding fixed jaw member adapted to engage one side of a tire casing, a complemental body member entirely supported by the base and formed with a movable jaw adapted to cooperate with the fixed jaw member to engage the opposite side of the tire casing, a pivot stud upon one of the members, the other member being provided with a series of bearing seats adapted to selectively engage the pivot stud to space the jaws different distances apart, and an arm rigid with the movable jaw and extending under the tire casing to support the same, whereby the weight of the tire casing tends to swing the arm downwardly and move the movable jaw member toward the fixed jaw member to grip the tire casing.

5. A display stand for tire casings and the like including a base adapted to rest upon a floor surface and provided with an upstanding jaw member adapted to engage one side of a tire casing, a complemental jaw member pivotally mounted upon the base and adapted to engage the opposite side of the tire casing, means for adjusting the distance between the jaw members, and an arm rigid with the complemental jaw member and extending under the tire casing to support the same, whereby the weight of the tire casing tends to swing the movable jaw toward the fixed jaw to grip the tire casing between the two jaws.

6. A display stand for tire casings and the like including a base adapted to rest upon a floor surface and provided with an upstanding fixed jaw member adapted to engage one side of a tire casing, a complemental body member pivoted to the base and adapted to engage the opposite side of the tire casing, a pivot stud upon one of the members, the other member being provided with a series of communicating notched seats, any selected one of which is adapted to engage the pivot stud to admit of adjustment of the jaw members toward and away from each other, and an arm rigid with the complemental jaw and extending under the tire casing to support the same, whereby the weight of the tire casing tends to swing the movable jaw toward the fixed jaw to grip the tire casing between the two jaws.

In testimony whereof I affix my signature.

HUGH S. HILL.